(12) United States Patent
Suresh et al.

(10) Patent No.: US 9,708,525 B2
(45) Date of Patent: Jul. 18, 2017

(54) METHODS OF USING NANO-SURFACTANTS FOR ENHANCED HYDROCARBON RECOVERY

(71) Applicant: Baker Hughes Incorporated, Houston, TX (US)

(72) Inventors: Radhika Suresh, Sugar Land, TX (US); Oleksandr V. Kuznetsov, Sugar Land, TX (US); Valery N. Khabashesku, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/169,432

(22) Filed: Jan. 31, 2014

(65) Prior Publication Data

US 2015/0218435 A1    Aug. 6, 2015

(51) Int. Cl.
*E21B 43/16*     (2006.01)
*C09K 8/58*      (2006.01)
*C09K 8/584*     (2006.01)

(52) U.S. Cl.
CPC .............. *C09K 8/58* (2013.01); *C09K 8/584* (2013.01); *C09K 2208/10* (2013.01)

(58) Field of Classification Search
CPC .......... E21B 43/16; E21B 43/26; E21B 33/13; E21B 43/267
USPC ...................................... 166/305.1, 267, 292
See application file for complete search history.

(56) References Cited

U.S. PATENT DOCUMENTS

| | | | |
|---|---|---|---|
| 5,350,014 A | 9/1994 | McKay | |
| 5,855,243 A * | 1/1999 | Bragg | 166/275 |
| 6,734,144 B2 * | 5/2004 | Varadaraj et al. | 507/103 |
| 6,828,281 B1 | 12/2004 | Hou et al. | |
| 7,033,975 B2 * | 4/2006 | Baran et al. | 507/102 |
| 7,186,673 B2 * | 3/2007 | Varadaraj et al. | 507/200 |
| 8,276,663 B2 | 10/2012 | Holtsclaw et al. | |
| 8,524,643 B2 | 9/2013 | Huff et al. | |
| 2009/0036605 A1 | 2/2009 | Ver Meer | |
| 2009/0082230 A1 * | 3/2009 | Javora et al. | 507/269 |
| 2010/0137168 A1 | 6/2010 | Quintero et al. | |
| 2010/0243248 A1 | 9/2010 | Golomb et al. | |

(Continued)

FOREIGN PATENT DOCUMENTS

| | | |
|---|---|---|
| KR | 1020120018239 A | 3/2012 |
| WO | 2014035861 A1 | 3/2014 |

OTHER PUBLICATIONS

He et al., Wet-Chemical Synthesis of Amphiphilic Rodlike Silica Particles and Their Molecular Mimetic Assembly in Selective Solvents, Angewandte Communications, Colloidal Particles, Angew. Chem. Int. Ed., vol. 51, 2012, pp. 3628-3633.

(Continued)

*Primary Examiner* — Silvana Runyan
(74) *Attorney, Agent, or Firm* — TraskBritt (57) ABSTRACT

Suspensions comprising amphiphilic nanoparticles and at least one carrier fluid. The amphiphilic nanoparticles include at least a hydrophilic portion and a hydrophobic portion. The hydrophilic portion comprises at least one hydrophilic functional group and the hydrophobic portion includes at least one hydrophobic functional group. Methods of forming the flooding suspension and methods of removing a hydrocarbon material using the flooding suspensions.

18 Claims, 4 Drawing Sheets

(56) References Cited

U.S. PATENT DOCUMENTS

| | | | |
|---|---|---|---|
| 2012/0015852 A1* | 1/2012 | Quintero | C09K 8/032 507/112 |
| 2012/0142111 A1* | 6/2012 | Tour et al. | 436/27 |
| 2013/0045897 A1* | 2/2013 | Chakraborty et al. | 507/117 |
| 2013/0200291 A1* | 8/2013 | Jessop | B01F 17/0042 252/61 |
| 2013/0233559 A1 | 9/2013 | van Zanten et al. | |
| 2013/0312970 A1* | 11/2013 | Lafitte | A61K 8/022 166/305.1 |
| 2014/0202928 A1 | 7/2014 | Ozum et al. | |

OTHER PUBLICATIONS

Jiang et al. Solvent-Free Synthesis of Janus Colloidal Particles, Langmuir, vol. 24, No. 18, 2008, pp. 10073-10077.

Kuijk et al., Synthesis of Monodisperse, Rodlike Silica Colloids with Tunable Aspect Ratio, J. Am. Chem. Soc., vol. 133, 2011, 7 pages.

Mejia et al, Pickering Emulsions Stabilized by Amphiphilic Nano-Sheets, http://pubs.rsc.org/en/conent/areticlelanding/2012/sm/c2sm25846c#!divAbstract, Soft Matter, vol. 8, Issue 40, 2012, pp. 10245-10253, Abstract only.

OE Digital, Nanoplate Surfactants Hold the Key?, http://www.oedigital.com/drilling/fluids/item/685-do-nanoplate-surfactants-hold-the-key, Nov. 1, 2012, pp. 3-5.

International Preliminary Report on Patentability for International Application No. PCT/US2014/071480, dated Aug. 2, 2016, 10 pages.

International Written Opinion for International Application No. PCT/US2014/071480 dated Apr. 14, 2015, 9 pages.

International Search Report for International Application No. PCT/US2014/071480 dated Apr. 14, 2015, 3 pages.

* cited by examiner

METHODS OF USING NANO-SURFACTANTS FOR ENHANCED HYDROCARBON RECOVERY

TECHNICAL FIELD

Embodiments of the disclosure relate generally to methods and systems of forming a stabilized emulsion and extracting a hydrocarbon material from a subterranean formation.

BACKGROUND

Water flooding is a conventional process of enhancing the extraction of hydrocarbon materials (e.g., crude oil, natural gas, etc.) from subterranean formations. In this process, an aqueous fluid (e.g., water, brine, etc.) is injected into the subterranean formation through injection wells to sweep a hydrocarbon material contained within interstitial spaces (e.g., pores, cracks, fractures, channels, etc.) of the subterranean formation toward production wells offset from the injection wells. One or more additives may be added to the aqueous fluid to assist in the extraction and subsequent processing of the hydrocarbon material.

For example, in some approaches, a surfactant, solid particles (e.g., colloids), or both are added to the aqueous fluid. The surfactant and/or the solid particles can adhere to or gather at interfaces between a hydrocarbon material and an aqueous material to form a stabilized emulsion of one of the hydrocarbon material and the aqueous material dispersed in the other of the hydrocarbon material and the aqueous material. Surfactants may decrease the surface tension between the hydrocarbon phase and the water phase, such as, for example, in an emulsion of a hydrocarbon phase dispersed within an aqueous phase. Stabilization by the surfactant, the solid particles, or both, lowers the interfacial tension between the hydrocarbon and water and reduces the energy of the system, preventing the dispersed material (e.g., the hydrocarbon material, or the aqueous material) from coalescing, and maintaining the one material dispersed as units (e.g., droplets) throughout the other material. Reducing the surface tension increases the permeability and the flowability of the hydrocarbon material. As a consequence, the hydrocarbon material may be more easily transported through and extracted from the subterranean formation as compared to water flooding processes that do not employ the addition of a surfactant and/or solid particles. The effectiveness of the emulsion is determined in large part by the ability of the emulsion to remain stable and ensure mixing of the two phases.

However, application of surfactants is usually limited by the cost of the chemicals and their adsorption and loss onto the rock of the hydrocarbon-containing formation. Disadvantageously, the affectivity of various surfactants can be detrimentally reduced in the presence of dissolved salts (e.g., such as various salts typically present within a subterranean formation). In addition, surfactants can have a tendency to adhere to surfaces of the subterranean formation, requiring the economically undesirable addition of more surfactant to the injected aqueous fluid to account for such losses. Solid particles can be difficult to remove from the stabilized emulsion during subsequent processing, preventing the hydrocarbon material and the aqueous material thereof from coalescing into distinct, immiscible components, and greatly inhibiting the separate collection of the hydrocarbon material. Furthermore, the surfactants are often functional or stable only within particular temperature ranges and may lose functionality at elevated temperatures or various conditions encountered within a subterranean formation.

BRIEF SUMMARY

Embodiments disclosed herein include methods of obtaining hydrocarbon material from a subterranean formation or from a bituminous sand, as well as related stabilized emulsions. For example, in accordance with one embodiment, a method of obtaining a hydrocarbon material comprises combining amphiphilic nanoparticles comprising a hydrophilic group and a hydrophobic group with a carrier fluid to a suspension. The method comprises contacting at least one of a subterranean formation and a slurry comprising bituminous sand and water with the suspension to form an emulsion stabilized by the amphiphilic nanoparticles and removing hydrocarbons from the emulsion stabilized by the amphiphilic nanoparticles.

In additional embodiments, a method of forming a suspension comprises hydrolyzing a hydrophilic compound comprising at least one of an orthosilicate, an oxysilane, an aminosilane, a silanol, an epoxy silane, and a metal alkoxide, to form an exposed hydroxyl group and hydrolyzing a hydrophobic compound comprising an oxysilane including a nonpolar hydrocarbon group. The method includes reacting the exposed hydroxyl group of the hydrophilic compound with a hydroxyl group of the hydrophobic compound to form amphiphilic nanoparticles and mixing the amphiphilic nanoparticles with at least one carrier fluid.

In further embodiments, a suspension comprises a plurality of amphiphilic nanoparticles. The amphiphilic nanoparticles comprise a base material comprising at least one of silica, a metal, and a metal oxide, a plurality of hydrophilic functional groups extending from a surface of the base material, and a plurality of hydrophobic functional groups extending from an opposite surface of the base material. The suspension comprises at least one carrier fluid.

BRIEF DESCRIPTION OF THE DRAWINGS

While the specification concludes with claims particularly pointing out and distinctly claiming what are regarded as embodiments of the invention, the advantages of embodiments of the disclosure may be more readily ascertained from the following description of certain embodiments of the disclosure when read in conjunction with the accompanying drawings, in which:

DETAILED DESCRIPTION

Illustrations presented herein are not meant to be actual views of any particular material, component, or system, but are merely idealized representations that are employed to describe embodiments of the disclosure.

The following description provides specific details, such as material types, compositions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. Additional acts or materials to extract a hydrocarbon material from a subterranean formation or from bituminous sands (e.g., oil sands, tar sands, etc.) may be performed by conventional techniques.

Methods of forming amphiphilic nanoparticles with dual functionality are described. As used herein, the term "nanoparticle" means and includes a particle having an average particle width or diameter of less than about 1,000 nm. As used herein, "amphiphilic nanoparticle" means and includes a nanoparticle exhibiting both hydrophilic and hydrophobic properties (e.g., similar to a Janus nanoparticle). For example, an amphiphilic nanoparticle may include both hydrophilic and hydrophobic functional groups. Surfactants including such amphiphilic nanoparticles may have a higher surface area and may be stable at higher temperatures and salt concentrations than traditional particle surfactants used to stabilize emulsions. In addition, functional groups on the amphiphilic nanoparticles may be formulated to interact with various media of different subterranean environments.

The amphiphilic nanoparticles may gather at, adhere to, and/or adsorb onto minerals within a subterranean formation, may adsorb to interfaces of a hydrocarbon material and an aqueous material, or both. The amphiphilic nanoparticles may form a stabilized emulsion (e.g., a Pickering emulsion) comprising units of one of the hydrocarbon material and the aqueous material. As used herein, the term "emulsion" refers to suspensions of droplets of one immiscible fluid dispersed in another fluid. The emulsion may reduce the interfacial tension between a continuous phase and a dispersed phase. Decreasing interfacial tension between, for example, a dispersed oil phase and a continuous aqueous phase may increase the hydrocarbon (e.g., oil) mobility and recovery from a subterranean formation or from a slurry of a bituminous sand including the hydrocarbon.

The amphiphilic nanoparticles may be formulated to remain at an interface between a polar phase and a nonpolar phase, between a hydrophilic phase and a hydrophobic phase, and/or between a hydrocarbon phase and an aqueous phase. The amphiphilic nanoparticles may stabilize an emulsion of the hydrocarbon phase within the aqueous phase or an emulsion of the aqueous phase within the hydrocarbon phase. Stabilizing the emulsion may prevent the emulsion from coalescing once the emulsion interface is formed. One side (e.g., the hydrophilic side) of the amphiphilic nanoparticles may be formulated to be attracted to the aqueous phase while the other side (e.g., the hydrophobic side) of the amphiphilic nanoparticles may be formulated to be attracted to the hydrocarbon phase.

The amphiphilic nanoparticles formed by the methods described herein may have a higher surface area than conventional surfactants. The functionalized surfaces of the amphiphilic nanoparticles may be formulated to interact with the interface between the hydrocarbon phase and the aqueous phase or with minerals within the subterranean formation, thereby forming a stable emulsion of a continuous aqueous or hydrocarbon phase and a dispersed phase of the other of the hydrocarbon and aqueous phase. The stability of the emulsion may be controlled by one or more of controlling the solubility of the amphiphilic nanoparticles within the aqueous phase, controlling the pH of the emulsion and/or the aqueous phase, and controlling the surface charge of the amphiphilic nanoparticles.

Figure 1A:
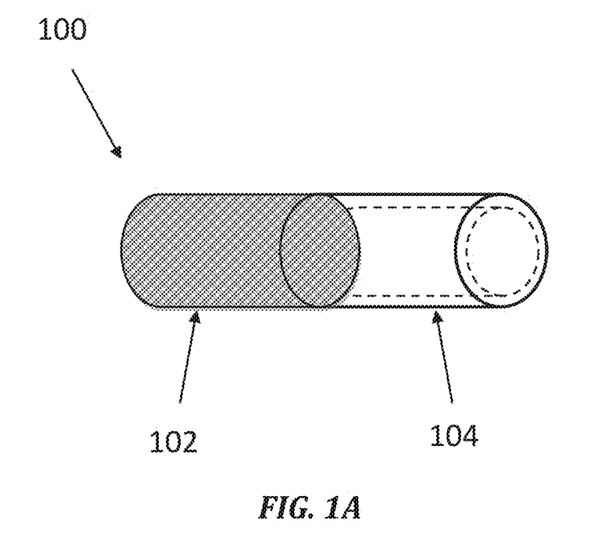
FIG. 1A through FIG. 1C are simplified schematics of an amphiphilic nanoparticle in accordance with embodiments of the disclosure.

Referring to FIG. 1A, an amphiphilic nanoparticle 100 is shown. The amphiphilic nanoparticle 100 may include a base portion. The amphiphilic nanoparticle 100 may include a hydrophilic portion 102 and a hydrophobic portion 104. Surfaces of the base portion may be modified with functional groups to impart desired physical and chemical properties to the surface of the amphiphilic nanoparticle 100. For example, the hydrophilic portion 102 may include at least one hydrophilic functional group on a surface of the base portion and the hydrophobic portion 104 may include at least one hydrophobic group on a surface of the base portion.

The base portion may include any material that may be chemically modified with functional groups to form the hydrophilic portion 102 and the hydrophobic portion 104. In some embodiments, the base portion includes a silica base. In other embodiments, the base portion includes a metal or a metal oxide. For example, the base portion may include a metal such as iron, titanium, germanium, tin, lead, zirconium, ruthenium, nickel, cobalt, oxides thereof, and combinations thereof. Thus, the base portion may include silica, a metal such as one of iron, titanium, germanium, tin, lead, zirconium, ruthenium, nickel, cobalt, and combinations thereof.

The amphiphilic nanoparticle 100 may be formed from a plurality of hydrophilic precursors and a plurality of hydrophobic precursors. As used herein, the term. "hydrophilic precursor" includes materials having at least one atom of silicon, iron, titanium, germanium, tin, lead, zirconium, ruthenium, nickel, and cobalt, and at least one hydrophilic functional group. As used herein, the term "hydrophobic precursor" includes materials having at least one atom of silicon, iron, titanium, germanium, tin, lead, zirconium, ruthenium, nickel, and cobalt, and at least one hydrophobic functional group. In some embodiments, a plurality of hydrophilic precursors may react to form a nanoparticle including a base of at least one of silica, a metal, and a metal oxide with one or more hydrophilic functional groups attached to the surface thereof. The hydrophilic functional groups of the hydrophilic portion 102 may be formed from the hydrophilic functional group of the hydrophilic precursor.

The surface of the base may be chemically modified to form amphiphilic nanoparticles 100 including a hydrophobic portion 104 in addition to the hydrophilic portion 102. The hydrophobic portion 104 may be formed from hydrophobic groups attached to the surface of the base. The hydrophobic groups may include nonpolar groups, such as, for example, alkyl chains. The hydrophilic portion 102 may be soluble in an aqueous phase, whereas the hydrophobic portion 104 may be soluble in an organic phase.

Figure 1B:
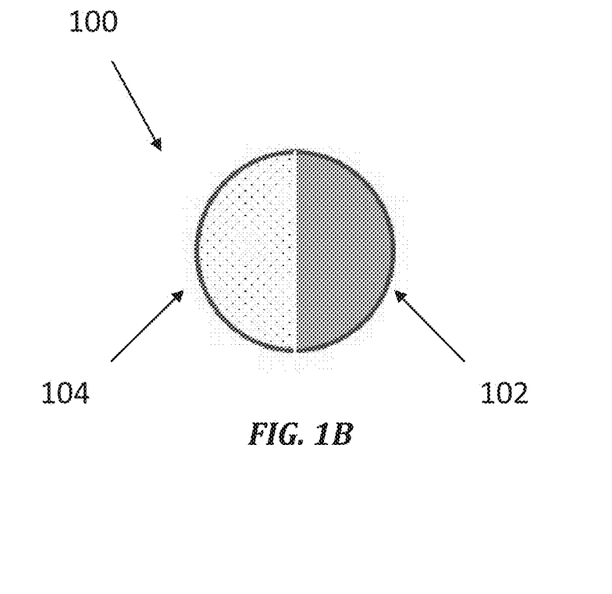
Figure 1C:
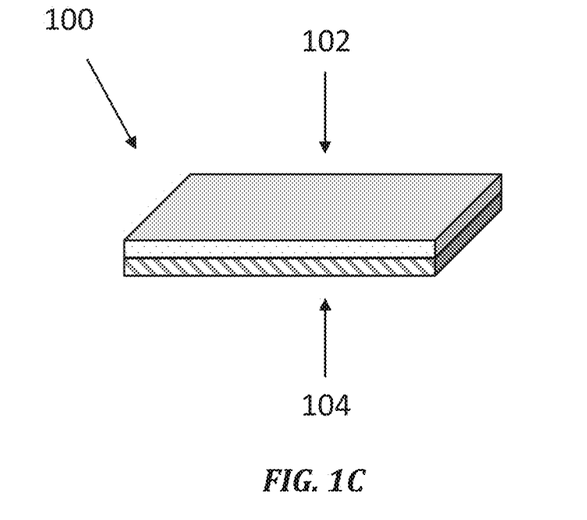

The amphiphilic nanoparticle 100 may be formed of various shapes. The shape of the amphiphilic nanoparticle 100 may be controlled by growing the amphiphilic nanoparticles in the presence of a structure-directing agent. Non-limiting examples of structure-directing agents include polymers such as a polypyrrole (e.g., polyvinylpyrrolidone (PVP)), an oxidized polypyrrole, a diphenyl ester, and cetyltrimethylammonium bromide (CTAB). With continued reference to FIG. 1A, the amphiphilic nanoparticle 100 may include a tubular-shaped base with a solid hydrophilic portion 102 and a hollow-tubular shaped hydrophobic portion 104. Referring to FIG. 1B, the amphiphilic nanoparticle 100 may be generally spherical in shape with a hydrophilic portion 102 on one side and a hydrophobic portion 104 on an opposite side. Referring to FIG. 1C, the amphiphilic nanoparticle 100 may have a platelet shape. One side of the platelet may be a hydrophilic portion 102 and the other side of the platelet may be a hydrophilic portion 104.

In some embodiments, the hydrophilic portion 102 of the amphiphilic nanoparticles 100 is formed before forming the hydrophobic portion 104. In some embodiments, the hydrophilic portion 102 is formed by hydrolyzing the hydrophilic precursor. The hydrophilic precursor may include an organosilane having the general formula, $R_nSiX_{(4-n)}$, where X is a hydrolyzable group, such as an alkoxy, acyloxy, amine, or halide group, and $R_n$ includes a hydrophilic functional group. As used herein, the term "hydrolyzable group" means and includes a group that can be at least partially depolymerized to lower molecular weight units by hydrolysis (i.e., the cleavage of a chemical bond by the reaction with water). The hydrolyzable group may be reactive with an aqueous material, such as water.

The hydrophilic precursor may include one or more hydrophilic functional groups such as a hydroxyl group ($-OH^-$), a carboxyl group ($-COOH^-$), a carbonyl group ($-C=O$), an amino group ($-NH_3^+$, $-NH_2$), a thiol group ($-SH$), a phosphate group ($-PO_4^{3-}$), or other hydrophilic or polar functional groups in addition to the hydrolyzable group.

The hydrophilic precursor may include oxysilanes, orthosilicates, aminosilanes, silanols, epoxy silanes, metal oxides, hydroxides, metal hydroxides, or combinations thereof. As used herein, the term "oxysilane" means and includes materials including a silicon atom bonded to at least one oxygen atom (e.g., $-Si-OR$, where R is a hydrocarbon material). As used herein, the term "orthosilicate" means and includes materials including a silicon atom bonded to four oxygen atoms (e.g., $Si(OR)_4$, where R is a hydrocarbon material).

The hydrophilic precursor may include orthosilicates, such as, for example, tetramethyl orthosilicate, tetraethyl orthosilicate (TEOS), tetrapropyl orthosilicate, trimethylmethoxysilane, triethylethoxysilane, or tripropylpropoxysilane. The hydrolysis of trimethylmethoxysilane, triethylethoxysilane, or tripropylpropoxysilane may form a silanol such as trimethylsilanol, triethylsilanol, or tripropyl silanol, respectively. In other embodiments, the hydrophilic precursor includes ethyoxysilanes such as trimethoxysilane, triethoxysilane, or tributyl(ethoxy)silane.

In other embodiments, the hydrophilic precursor includes metal hydroxides and metal salts. For example, the hydrophilic precursor may include metal hydroxides such as an iron hydroxide, titanium hydroxide (e.g., $TiO(OH)_2$, $Ti(OH)_4$), germanium hydroxide, tin hydroxide, lead hydroxide, zirconium hydroxide, ruthenium hydroxide, nickel hydroxide, and cobalt hydroxide. In some embodiments, the hydrophilic precursor includes a metal salt such as salts of at least one of iron, titanium, germanium, tin, lead, zirconium, ruthenium, nickel, and cobalt. In some embodiments, a hydrophilic precursor including a metal hydroxide may react with an exposed hydroxyl group on a surface of the base of the nanoparticle.

In other embodiments, the hydrophilic precursor includes a metal oxide. For example, the hydrophilic precursor may include iron oxide ($Fe_2O_3$, $Fe_3O_4$), titanium dioxide, germanium oxide (GeO, $GeO_2$), tin oxide (SnO, $SnO_2$), lead oxide (PbO, $PbO_2$, $Pb_3O_4$), zirconium oxide, ruthenium oxide ($RuO_2$, $RuO_4$), nickel oxide (NiO, $Ni_2O_3$), and cobalt oxide (CoO, $Co_2O_3$, $Co_3O_4$). In other embodiments, the hydrophilic precursor may include a metal alkoxide. For example, the hydrophilic precursor may include iron ethoxide, titanium isopropoxide, titanium ethoxide, germanium ethoxide, tin ethoxide, lead ethoxide, zirconium ethoxide, and nickel(II) methoxide.

In other embodiments, the hydrophilic precursor may include an aminosilane including at least one amino group. The at least one amino group may be in addition to at least two oxysilane groups. Non-limiting examples of suitable aminosilanes include (3-aminopropyl)-diethoxy-methylsilane (APDEMS), (3-aminopropyl)-trimethoxysilane (APTMS), (3-aminopropyl)-methyldiethoxysilane, (3-aminopropyl)-triethoxysilane (APTES), 3-aminopropyltriethoxysilane, bis(3-triethoxysilylpropyl)amine, and bis(3-trimethoxysilylpropyl)amine. Hydrolysis of the aminooxysilanes may form a hydroxyl terminated hydrophilic portion 102 including amino groups. In some embodiments, the aminosilanes may be reacted with, for example, an ethylene carbonate to form a hydrophilic portion 102 including exposed hydroxyl groups.

In other embodiments, the hydrophilic precursor may include an epoxy silane. Non-limiting examples of epoxy silanes include 3-glycidoxypropyltrimethoxysilane, 3-glycidoxypropylmethyldiethoxysilane, and 3-glycidyloxypropyltriethoxysilane. The epoxy silane may be hydrolyzed to form exposed hydroxyl groups on the hydrophilic portion 102.

The synthesis of the hydrophilic portion 102 of the amphiphilic nanoparticles 100 may be carried out in a polar solvent. The hydrophilic portion 102 may be soluble in the solvent. The solvent may include an alcohol such as methanol, ethanol, propanol, butanal, pentanol, other alcohol, acetone, or combinations thereof. The hydrophilic precursor may be soluble in the solvent.

Additional agents may be added to the reaction solution. For example, structure-directing agents, such as polyvinylpyrrolidone (PVP), may be mixed into the reaction solution. The pH of the reaction solution may be varied by adding various acids or bases. For example, the pH of the solution may be increased by adding sodium bicarbonate, sodium hydroxide, or other base to the solution. The pH of the solution may be decreased by adding an acid such as hydrochloric acid, acetic acid, or other acid to the solution.

The synthesis of the hydrophilic portion 102 may be carried out at room temperature. In some embodiments, the reaction solution may be heated to increase a reaction rate of formation of the hydrophilic portion 102 of the amphiphilic nanoparticles 100. In other embodiments, the reaction rate may be increased by microwave irradiation. The reaction may proceed for between about one minute and several hours. In some embodiments, the size of the hydrophilic portion 102 may be increased by increasing the synthesis time of forming the hydrophilic portion 102. In embodiments where the hydrophilic portion 102 is formed by hydrolysis, the reaction may leave one or more exposed hydroxyl groups on the hydrophilic portion 102. The hydrophilic portion 102 may include one or more additional functional groups, such as additional hydroxyl groups, a carboxyl group, a carbonyl group, an amino group, a thiol group, and a phosphate group.

The hydrophilic precursor may be hydrolyzed to form a plurality of hydrophilic precursors with exposed hydroxyl groups. The exposed hydroxyl groups of the hydrophilic precursors may react with each other in a condensation reaction, forming the hydrophilic portion 102 including a base material and hydrophilic functional groups on a surface of the base material. The exposed functional groups may be the same functional groups as the functional groups of the hydrophilic precursor. A surface of the hydrophilic portion

102 may have the general structure as shown below, where $R_n$ includes a hydrophilic group, and M is at least one of silicon, iron, titanium, germanium, tin, lead, zirconium, ruthenium, nickel, and cobalt. In embodiments where M is a metal (e.g., iron, titanium, germanium, tin, lead, zirconium, ruthenium, nickel, and cobalt), adjacent metal atoms may be directly bonded to each other without intervening oxygen atoms.

A hydrophobic precursor may be added to the reaction solution including the hydrophilic portion 102. An organic solvent in which the hydrophobic precursor is soluble may be added to the reaction mixture. In some embodiments, the organic solvent is a nonpolar solvent. The hydrophobic functional group of the hydrophobic precursor may be soluble in an organic phase whereas the hydrophilic functional group on the surface of the base material may be soluble in an aqueous phase.

The amphiphilic nanoparticles 100 may be formed by reacting at least some of the exposed hydroxyl groups of the hydrophilic portion 102 with one or more of the hydrophobic precursors. The hydrophobic precursor may include one or more exposed hydroxyl groups. In some embodiments, the hydrophobic precursor is hydrolyzed to create exposed hydroxyl groups on the hydrophobic precursor.

In some embodiments, the hydrophobic portion 104 grows from one end of the hydrophilic portion 102. Without being bound by any theory, it is believed that only a portion of the hydrophilic portion 102 contacts the nonpolar solvent in which the hydrophobic precursors are dissolved because of the insolubility of the hydrophilic portion 102 in the nonpolar solvent. The hydroxyl groups of a portion of the hydrophilic portion 102 that contacts the hydrophobic precursor (e.g., at an interface between the nonpolar solvent and the polar solvent of the hydrophilic portion 102) may react with the hydrophobic precursors to form the hydrophobic portion 104 of the amphiphilic nanoparticle 100. An exposed surface of the hydrophobic portion 104 may have a general structure as shown below, where $R_m$ includes a hydrophobic functional group, and M is at least one of silicon, iron, titanium, germanium, tin, lead, zirconium, ruthenium, nickel, and cobalt. In embodiments where M is a metal (e.g., iron, titanium, germanium, tin, lead, zirconium, ruthenium, nickel, and cobalt), adjacent metal atoms may be directly bonded to each other without intervening oxygen atoms.

The amphiphilic nanoparticle 100 may include one or more exposed hydrophobic, nonpolar organic groups from the hydrophobic precursor, and one or more functional groups (e.g., hydroxyl, carboxyl, carbonyl, amino, thiol, phosphate, a metal, a metal oxide) from the hydrophilic precursor.

The hydrophobic precursor may include an oxysilane including a nonpolar, organic component. The hydrophobic precursor may include at least one central atom such as silicon, iron, titanium, germanium, tin, lead, zirconium, ruthenium, nickel, and cobalt, one or more hydrocarbon groups bonded to the central atom, and one or more alkoxy groups bonded to the central atom. In other embodiments, the hydrophobic precursor includes a hydrocarbon bonded to an isocyanate functional group (—N=C=O), such as octadecyl isocyanate. In some embodiments, the hydrocarbon group is an alkyl such as methyl, ethyl, propyl, butyl, pentyl, hexyl, octyl, dodecyl, and/or octadecyl groups, an alkaryl group such as benzyl groups attached via the aryl portion (e.g., 4-methylphenyl, 4-hydroxymethylphenyl, or 4-(2-hydroxyethyl)phenyl, and/or aralkyl groups attached at the benzylic (alkyl) position, such as in a phenylmethyl and 4-hydroxyphenylmethyl groups, and/or attached at the 2-position, such as in a phenethyl and 4-hydroxyphenethyl groups); lactone groups, imidazole, and pyridine groups. In some embodiments, the alkoxy group is a methoxy group, an ethoxy group, a propoxy group, or a butoxy group. The hydrophobic precursors may include alkyloxysilanes, such as trialkoxysilanes including trimethoxysilane, isobutyltriethoxysilane, isobutyltrimethoxysilane, vinyltrimethoxysilane, hexadecyltrimethoxysilane (HDTMOS), methyltrimethoxysilane, ethyltrimethoxysilane, octyltrimethoxysilane, octyltriethoxysilane, or other oxysilanes.

The hydrophobicity of the hydrophobic portion 104 may be controlled by altering the number of functional groups and the size of the functional groups of the hydrophobic precursor. In some embodiments, the hydrophobicity of the hydrophobic portion 104 is increased by increasing the carbon content of the functional group of the hydrophobic precursor. For example, ethyltrimethoxysilane may be more hydrophobic than methyltrimethoxysilane. Similarly, hexadecyltrimethoxysilane may be more hydrophobic than ethyltrimethoxysilane. The hydrophobicity of the amphiphilic nanoparticles 100 may also be increased by increasing a concentration of the hydrophobic functional group relative to a concentration of the hydrophilic functional group in the reaction mixture or by decreasing a reaction time of forming the hydrophilic portion 102 relative to a reaction time of forming the hydrophobic portion 104.

The amphiphilic nanoparticles 100 may be removed from the reaction solution by centrifugation, ultrafiltration, or combinations thereof. In some embodiments, the amphiphilic nanoparticles 100 are recovered by flowing the solution through a membrane filter. The filter may have a pore size ranging from between about 10 nm and about 1,000 nm, such as between about 10 nm and about 100 nm, between about 100 nm and about 200 nm, between about 200 nm and about 400 nm, or between about 400 nm and about 1,000 nm. In some embodiments, the solution is flowed through a filter having a pore size of between about 200 nm and about 400 nm. The resulting solid residue may be dried and collected. The solid residue may include amphiphilic nanoparticles 100 with a hydrophilic portion 102 and a hydrophobic portion 104. The hydrophobic portion 104 may be opposite the hydrophilic portion 102 such that one portion of the amphiphilic nanoparticle 100 is attracted to and soluble in a hydrocarbon phase and another portion of the amphiphilic nanoparticle 100 is attracted to and soluble in an aqueous phase.

The amphiphilic nanoparticles 100 may have a size distribution ranging from between about 10 nm and about 1,000 nm. In some embodiments, the size distribution may correspond to the size of the filter through which the solution was passed to separate the nanoparticles from the reaction solution. The amphiphilic nanoparticles 100 may be monodisperse wherein each of the amphiphilic nanoparticles 100 has substantially the same size, shape, and material composition, or may be polydisperse, wherein the amphiphilic nanoparticles 100 include a range of sizes, shapes, and/or material composition. In some embodiments, each of the amphiphilic nanoparticles 100 has substantially the same size and the same shape as each of the other amphiphilic nanoparticles 100.

The amphiphilic nanoparticles 100 may stabilize an emulsion at higher temperatures than a typical surfactant. For example, typical surfactants may degrade or otherwise lose functionality at temperatures in excess of about 250° C. However, the amphiphilic nanoparticles 100 described herein may be stable at high temperatures that may be encountered within a subterranean formation. For example, the amphiphilic nanoparticles 100 may be stable at temperatures up to about 500° C. In some embodiments, the amphiphilic nanoparticles 100 are exposed to a temperature between about 250° C. and about 500° C., such as between about 300° C. and about 400° C., or between about 400° C. and about 500° C., and may remain stable.

The amphiphilic nanoparticles 100 may remain effective at stabilizing an emulsion at higher salinity concentrations than typical surfactants. Due to the presence of the functional groups on the amphiphilic nanoparticles 100, the amphiphilic nanoparticles 100 may be repelled from the salts of a brine solution, whereas non-functionalized particles may tend to agglomerate or gel with a salt.

The amphiphilic nanoparticles 100 may be stable within a wide pH range. For example, the amphiphilic nanoparticles 100 may be formulated to be stable at a pH between about 3.0 and about 12.0. In some embodiments, the amphiphilic nanoparticles 100 are formulated to be stable at a pH as high as about 12.0 by forming the amphiphilic nanoparticles 100 from anionic functional groups such as hydroxyl groups, carboxylate groups, carboxyl groups, sulfate groups, phosphate groups, or other anionic groups. In other embodiments, the amphiphilic nanoparticles 100 are formulated to be stable at a pH as low as about 3.0 by including terminal ends of cationic groups such as amine groups.

The amphiphilic nanoparticles 100 may stabilize an emulsion in any application where a stable emulsion is desired. For example, the amphiphilic nanoparticles 100 may be used in water flooding applications or floatation cell applications. The amphiphilic nanoparticles 100 may stabilize an emulsion by themselves, or the amphiphilic nanoparticles 100 may be used with one or more surfactants.

Figure 2:
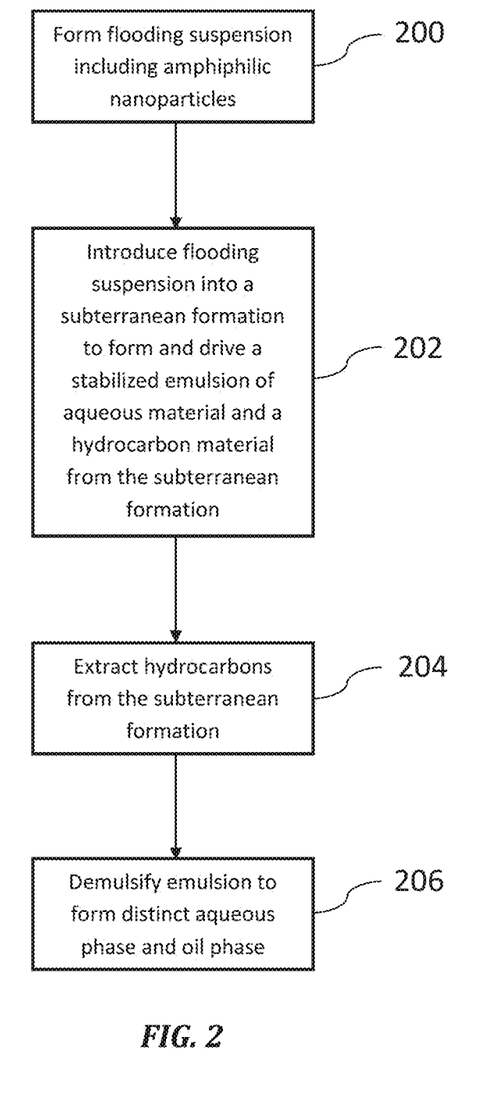
FIG. 2 is a simplified flow diagram depicting a method of extracting hydrocarbons from a subterranean formation, in accordance with embodiments of the disclosure.

Referring to FIG. 2, a simplified flow diagram illustrating a method of obtaining a hydrocarbon material contained within a subterranean formation, in accordance with embodiments of the disclosure is shown. The method may include a suspension formation process 200 including forming a flooding suspension including a plurality of amphiphilic nanoparticles; a flooding process 202 including introducing the flooding suspension into a subterranean formation to detach a hydrocarbon material from surfaces of the subterranean formation and form a stabilized emulsion of the hydrocarbon material and an aqueous material; an extraction process 204 including flowing (e.g., driving, sweeping, forcing, etc.) the stabilized emulsion from the subterranean formation; and an emulsion destabilization process 206 including destabilizing (e.g., demulsifying, precipitating, etc.) the emulsion into distinct, immiscible phases.

The suspension formation process 200 may include forming a suspension including amphiphilic nanoparticles and at least one carrier fluid. The at least one carrier fluid may, for example, comprise water, or a brine solution. As used herein, the term "suspension" means and includes a material including at least one carrier fluid in which amphiphilic nanoparticles are substantially uniformly dispersed. The suspension may be a flooding suspension used, such as used in water flooding of a subterranean formation during enhanced oil recovery processes. The amphiphilic nanoparticles of the flooding suspension may be compatible with other components (e.g., materials, constituents, etc.) of the flooding suspension. As used herein, the term "compatible" means that a material does not impair the functionality of the amphiphilic nanoparticles or cause the amphiphilic nanoparticles to lose functionality as surfactants and emulsion stabilizers.

The flooding suspension may be formulated to include a concentration of the amphiphilic nanoparticles ranging from between about 50 ppm to about 50,000 ppm. For example, in some embodiments, the flooding suspension may have a concentration of amphiphilic nanoparticles ranging from between about 50 ppm and about 500 ppm, between about 500 ppm and about 1,000 ppm, between about 1,000 ppm and about 5,000 ppm, or above 5,000 ppm. In some embodiments, the flooding suspension may have a concentration ranging from between about 50 ppm to about 5,000 ppm. The emulsion may have the same, a higher, or a lower concentration of amphiphilic nanoparticles than the flooding suspension.

With continued reference to FIG. 2, the flooding process 202 may include introducing the flooding suspension including amphiphilic nanoparticles into a subterranean formation to detach a hydrocarbon material from surfaces of the subterranean formation and form a stabilized emulsion of the hydrocarbon material and an aqueous material. The flooding suspension may be provided into the subterranean formation through conventional processes. For example, a pressurized stream of the flooding suspension may be pumped into an injection well extending to a desired depth in the subterranean formation, and may infiltrate (e.g., permeate, diffuse, etc.) into interstitial spaces of the subterranean formation. The extent to which the flooding suspension infiltrates the interstitial spaces of the subterranean formation at least partially depends on the properties of the flooding suspension (e.g., density, viscosity, material composition, etc.), and the hydrocarbon materials (e.g., molecular weight, density, viscosity, etc.) contained within interstitial spaces of the subterranean formation.

The pH of the flooding suspension may be altered to control the solubility of the amphiphilic nanoparticles within the flooding suspension. For example, where the amphiphilic nanoparticles include cationic functional groups (e.g., amino groups), decreasing the pH of the flooding suspension may increase the solubility of the amphiphilic nanoparticles in the aqueous flooding suspension. Where the amphiphilic nanoparticles include anionic functional groups (e.g., hydroxyl, carboxyl, carbonyl, phosphate, thiol groups, etc.), increasing the pH of the flooding suspension may increase the solubility of the amphiphilic nanoparticles in the flooding suspension. Altering the pH of the flooding suspension may alter the surface charge of the amphiphilic nanoparticles. For example, increasing a pH of a flooding suspension including anionic amphiphilic nanoparticles may increase the net charge of the anionic amphiphilic nanoparticles in the flooding suspension. Decreasing a pH of a flooding suspension including cationic amphiphilic nanoparticles may increase the net charge of the cationic amphiphilic nanoparticles.

After the flooding suspension is introduced into the subterranean formation, the pH of the flooding suspension may be altered to reduce the solubility of the amphiphilic nanoparticles in the aqueous phase of the flooding suspension. For example, where the amphiphilic nanoparticles include cationic functional groups, the pH of the flooding suspension may be reduced to cause the amphiphilic nanoparticles to move to the interface between the aqueous phase and the hydrocarbon phase. In some embodiments, the pH may be reduced to below about 7.0, such as below 5.0, below 4.0, or below 3.0. Where the amphiphilic nanoparticles comprise anionic functional groups, the pH of the flooding suspension may be increased to cause the amphiphilic nanoparticles to move to the interface between the aqueous phase and the hydrocarbon phase. In some embodiments, the pH may be increased to above 7.0, such as above 8.0, above 9.0, above 10.0, and up to 12.0.

The amphiphilic nanoparticles are structured and formulated to facilitate a formation of a stabilized emulsion of a hydrocarbon material and an aqueous material. For example, the amphiphilic nanoparticles may be structured and formulated to gather (e.g., agglomerate) at, adhere to, and/or adsorb to interfaces of a hydrocarbon material and an aqueous material to form a Pickering emulsion comprising units (e.g., droplets) of one of the hydrocarbon material and the aqueous material dispersed in the other of the hydrocarbon material and the aqueous material. The amphiphilic nanoparticles may prevent the dispersed material (e.g., the hydrocarbon material or the aqueous material) from coalescing, and may thus maintain the dispersed material as units throughout the other material.

The extraction process 204 may include flowing (e.g., driving, sweeping, forcing, etc.) the stabilized emulsion from the subterranean formation to the surface. The amphiphilic nanoparticles prevent the dispersed material from coalescing and enable substantial removal of hydrocarbons from the subterranean formation.

Once the hydrocarbons are removed from the subterranean formation, at least a portion of the emulsion may be destabilized in the emulsion destabilization process 206 to form distinct, immiscible phases including an aqueous phase and a hydrocarbon phase. One or more properties (e.g., temperature, pH, material composition, pressure, etc.) of the stabilized emulsion or the aqueous phase may be modified (e.g., altered, changed) to a least partially destabilize the emulsion. For example, the pH of the aqueous phase may be modified to increase the solubility of the amphiphilic nanoparticles within the aqueous phase, thereby destabilizing the emulsion and forming distinct, immiscible phases.

In some embodiments, the pH of the emulsion or the aqueous phase may be altered to cause the amphiphilic nanoparticles to move into the aqueous phase and destabilize the emulsion. Where the amphiphilic nanoparticles comprise anionic functional groups, the pH of the aqueous phase may be increased to increase the solubility of the amphiphilic nanoparticles in the aqueous phase. The pH of the aqueous phase may be increased by adding a base, such as a hydroxide (e.g., sodium hydroxide) or a bicarbonate (e.g., sodium bicarbonate) to the aqueous phase. Where the amphiphilic nanoparticles comprise cationic functional groups, the pH of the aqueous phase may be reduced to increase the solubility of the amphiphilic nanoparticles in the aqueous phase. The pH of the aqueous solution may be decreased by adding hydrochloric acid, phosphoric acid, and acetic acid, or another acid to the aqueous solution.

A demulsifier may be added to the emulsion to destabilize the emulsion and form distinct, immiscible phases including an aqueous phase and a hydrocarbon phase. In some embodiments, the emulsion is destabilized by adjusting the pH of at least one of the aqueous phase and the emulsion and by adding a demulsifier to the emulsion.

Figure 3:
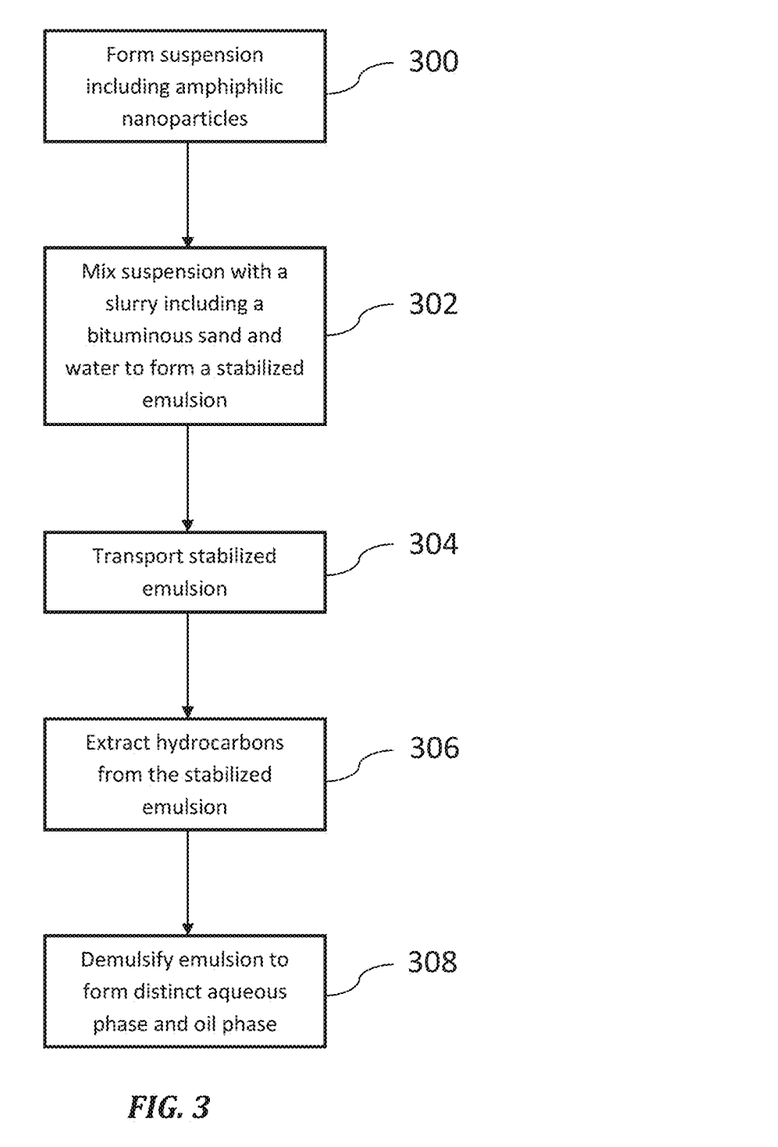
FIG. 3 is a simplified flow diagram depicting a method of recovering hydrocarbons from bituminous sand, in accordance with embodiments of the disclosure.

Referring to FIG. 3, a simplified flow diagram illustrating a method of obtaining a hydrocarbon material from bituminous sand in accordance with other embodiments of the disclosure is shown. The method may include a suspension formation process 300 including forming a suspension including a plurality of amphiphilic nanoparticles; a mixing process 302 including mixing the suspension with a slurry including the bituminous sand and water to form a stabilized emulsion; a transportation process 304 including hydrotransporting the slurry; an extraction process 306 including extracting hydrocarbons from the stabilized emulsion; and an emulsion destabilization process 308 including destabilizing (e.g., demulsifying precipitating, etc.) the emulsion into distinct, immiscible phases.

The suspension formation process 300 may include forming a suspension including the amphiphilic nanoparticles and at least one carrier fluid. The carrier fluid may, for example, comprise water, a brine solution, or a caustic soda (NaOH) solution. The suspension may be formulated to include a concentration of amphiphilic nanoparticles similar to the flooding suspension described above with reference to FIG. 2.

The mixing process 302 may include mixing the suspension with a slurry including a bituminous sand and water to form a stabilized emulsion. The slurry may include hot water, caustic soda, and the bituminous sand. The transportation process 304 may include hydrotransporting the slurry to a location where the stabilized emulsion may be processed to remove hydrocarbons therefrom (e.g., from the bituminous sand). In some embodiments, the mixing process 302 may be performed simultaneously with the transportation process 304. In some embodiments, a pH of the slurry may be adjusted to reduce the solubility of the amphiphilic nanoparticles in a hydrophilic portion of the slurry and increase the solubility of the amphiphilic nanoparticles in the stabilized emulsion during the mixing process and the transportation process 304.

The amphiphilic nanoparticles are structured and formulated to facilitate a formation of a stabilized emulsion of a hydrocarbon material and an aqueous phase. For example, the amphiphilic nanoparticles may be structured and formulated to gather at, adhere to, and/or adsorb to interfaces of the hydrocarbon material and the aqueous material to form a Pickering emulsion comprising units (e.g., droplets) of one of the hydrocarbon material and the aqueous material in the other of the hydrocarbon material and the aqueous material.

The extraction process 306 may include extracting hydrocarbons from the stabilized emulsion. In some embodiments, the extraction process 306 includes extracting hydrocarbons from the stabilized emulsion of the slurry in a floatation process.

After the hydrocarbons are removed from the aqueous phase in the floatation process, at least a portion of the stabilized emulsion may be destabilized in the emulsion destabilization process 308 to form distinct, immiscible phases including an aqueous phase and a hydrocarbon phase. One or more properties (e.g., temperature, pH, material composition, pressure, etc.) of the stabilized emulsion or the aqueous phase may be modified (e.g., altered, changed)

to a least partially destabilize the emulsion. For example, the pH of the aqueous phase may be modified to increase the solubility of the amphiphilic nanoparticles within the aqueous phase, thereby destabilizing the emulsion and forming distinct, immiscible phases. The pH of the stabilized emulsion may be altered to cause the amphiphilic nanoparticles to move into the aqueous phase and destabilize the emulsion, as described above with reference to emulsion destabilization process 206 of FIG. 2. In other embodiments, a demulsifier may be added to the emulsion to destabilize the emulsion and form distinct, immiscible phases including an aqueous phase and a hydrocarbon phase.

After the emulsion is destabilized, the hydrocarbon material may be separated from the aqueous material and recovered. Thereafter, the amphiphilic nanoparticles may be recovered from the aqueous phase. In some embodiments, the pH of the aqueous solution may be adjusted to reduce the solubility of the amphiphilic nanoparticles in the aqueous solution and precipitate the amphiphilic nanoparticles from the aqueous solution. For example, where the amphiphilic nanoparticles include functional groups such as amine functional groups, decreasing the pH of the aqueous material may reduce the solubility of the amphiphilic nanoparticles in the aqueous solution, thereby causing them to precipitate out of the aqueous solution. In embodiments where the functional group of the amphiphilic nanoparticles are hydroxyl, carboxyl, carbonyl, thiol, phosphate, or other anionic groups, increasing the pH of the aqueous solution may cause the amphiphilic nanoparticles to precipitate out of the aqueous solution. In other embodiments, the amphiphilic nanoparticles are recovered by filtering the aqueous solution through a filter. The filter may have a pore size ranging from between about 10 nm and about 5,000 nm, depending on the size of the amphiphilic nanoparticles. In some embodiments, more than one filtration step may be performed. For example, a first filtration step may filter out sands and other solid particles having a larger diameter than the amphiphilic nanoparticles. Thereafter, the amphiphilic nanoparticles may be separated from the aqueous solution.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of obtaining a hydrocarbon material, the method comprising:
    combining amphiphilic nanoparticles with a carrier fluid to form an aqueous suspension, each amphiphilic nanoparticle comprising a base portion, hydrophobic groups attached to a first side of the base portion, and hydrophilic groups comprising anionic functional groups or cationic functional groups attached to a second side of the base portion;
    before introducing the aqueous suspension into a subterranean formation, modifying a pH of the aqueous suspension, wherein modifying the pH of the aqueous suspension comprises:
        decreasing the pH of the aqueous suspension comprising amphiphilic nanoparticles including cationic functional groups to increase a solubility of the amphiphilic nanoparticles in the aqueous suspension responsive to decreasing the pH of the aqueous suspension; or
        increasing the pH of the aqueous suspension comprising amphiphilic nanoparticles including anionic functional groups to increase the solubility of the amphiphilic nanoparticles in the aqueous suspension responsive to increasing the pH of the aqueous suspension;
    introducing the aqueous suspension into a subterranean formation and contacting hydrocarbons within the subterranean formation with the aqueous suspension to form an emulsion stabilized by the amphiphilic nanoparticles; and
    removing hydrocarbons from the emulsion stabilized by the amphiphilic nanoparticles.

2. The method of claim 1, wherein combining the amphiphilic nanoparticles with the carrier fluid to form the aqueous suspension comprises combining amphiphilic nanoparticles, each amphiphilic nanoparticle comprising at least one of silica and at least one metal selected from the group consisting of iron, titanium, germanium, tin, lead, zirconium, ruthenium, nickel, and cobalt.

3. The method of claim 2, wherein combining the amphiphilic nanoparticles with the carrier fluid to form the aqueous suspension comprises combining amphiphilic nanoparticles comprising an amino functional group with the carrier fluid.

4. The method of claim 1, wherein combining the amphiphilic nanoparticles with the carrier fluid to form the aqueous suspension comprises selecting the aqueous suspension to comprise from about 50 ppm to about 500 ppm of the amphiphilic nanoparticles.

5. The method of claim 1, further comprising destabilizing the emulsion after removing hydrocarbons from the emulsion stabilized by the amphiphilic nanoparticles.

6. The method of claim 5, wherein destabilizing the emulsion comprises increasing a solubility of the amphiphilic nanoparticles in the aqueous phase.

7. The method of claim 6, wherein destabilizing the emulsion comprises altering a pH of the aqueous phase.

8. The method of claim 1, further comprising separating at least a portion of the amphiphilic nanoparticles from the emulsion after removing hydrocarbons from the emulsion stabilized by the amphiphilic nanoparticles.

9. The method of claim 8, wherein separating at least the portion of the amphiphilic nanoparticles from the emulsion after removing hydrocarbons from the emulsion stabilized by the amphiphilic nanoparticles comprises decreasing a solubility of the amphiphilic nanoparticles in the aqueous phase to precipitate the amphiphilic nanoparticles.

10. The method of claim 1, wherein combining the amphiphilic nanoparticles with the carrier fluid to form the aqueous suspension comprises:
    combining at least some amphiphilic nanoparticles comprising a base portion including silica with the carrier fluid; and
    combining at least some amphiphilic nanoparticles comprising a base portion including at least one of a metal and a metal oxide with the carrier fluid.

11. The method of claim 1, wherein combining the amphiphilic nanoparticles with the carrier fluid to form the aqueous suspension comprises combining amphiphilic nanoparticles comprising at least one of iron, titanium, germanium, tin, lead, zirconium, ruthenium, nickel, cobalt, oxides thereof, or combinations thereof with the carrier fluid.

12. The method of claim 1, wherein combining the amphiphilic nanoparticles with the carrier fluid to form the aqueous suspension comprises combining tubular-shaped nanoparticles with the carrier fluid, each tubular-shaped nanoparticle comprising a solid hydrophilic base and a hollow tubular-shaped hydrophobic portion.

13. The method of claim 1, wherein combining the amphiphilic nanoparticles further comprises selecting the hydrophilic groups from the group consisting of an amino group, a hydroxyl group, a carboxyl group, a carbonyl group, a phosphate group, and an amino group.

14. The method of claim 1, wherein combining the amphiphilic nanoparticles further comprises selecting the hydrophilic groups to comprise amino groups and hydroxyl groups.

15. The method of claim 1, wherein combining the amphiphilic nanoparticles with the carrier fluid to form the aqueous suspension comprises forming a suspension comprising amphiphilic nanoparticles having a diameter of between about 200 nm and about 1000 nm.

16. The method of claim 1, wherein forming an emulsion stabilized by the amphiphilic nanoparticles comprises forming an emulsion of a hydrocarbon phase dispersed within an aqueous phase.

17. The method of claim 1, further comprising altering a surface charge of the amphiphilic nanoparticles within the aqueous suspension.

18. The method of claim 1, further comprising selecting the hydrophobic groups to comprise an alkyl group.

* * * * *

UNITED STATES PATENT AND TRADEMARK OFFICE
CERTIFICATE OF CORRECTION

PATENT NO.         : 9,708,525 B2
APPLICATION NO.    : 14/169432
DATED              : July 18, 2017
INVENTOR(S)        : Radhika Suresh, Oleksandr V. Kuznetsov and Valery N. Khabashesku It is certified that error appears in the above-identified patent and that said Letters Patent is hereby corrected as shown below:

In the Specification
Column 2,    Line 14,    change "a suspension." to --form a suspension.--
Column 4,    Line 28,    change "term. "hydrophilic" to --term "hydrophilic--

Signed and Sealed this
Second Day of January, 2018

Joseph Matal
*Performing the Functions and Duties of the*
*Under Secretary of Commerce for Intellectual Property and*
*Director of the United States Patent and Trademark Office*